United States Patent [19]

Yin et al.

[11] Patent Number: 4,978,593
[45] Date of Patent: Dec. 18, 1990

[54] HOLOGRAM TRANSFER PROCESS

[75] Inventors: Khin S. Yin, Alhambra; Michael J. Virgadamo, Pasadena; David D. Tanaka, Downey; Angel F. Banuelos, Oxnard, all of Calif.

[73] Assignee: Hughes Aircraft Company, Los Angeles, Calif.

[21] Appl. No.: 411,760

[22] Filed: Sep. 25, 1989

[51] Int. Cl.⁵ .............................................. G03C 11/12
[52] U.S. Cl. ................................................ 430/2; 430/1; 430/258; 430/252; 350/3.7
[58] Field of Search ................. 430/1, 2, 258, 256, 430/252; 350/3.7, 3.72; 156/247

[56] References Cited

U.S. PATENT DOCUMENTS 4,842,389  6/1989  Wood et al. .................... 350/3.7

Primary Examiner—Jose Dees
Assistant Examiner—J. Weddington
Attorney, Agent, or Firm—Leonard A. Alkov; Wanda K. Denson-Low

[57] ABSTRACT

A method is disclosed for making holograms on transparent surfaces. A protective thin substrate 18 is laminated to a temporary support 24 for processing. This procedure protects the delicate thin substrate 18 through the processing steps. Upon completion of the processing steps, the thin substrate 18 is then removed from the temporary support 24. The applied photosensitive material gives the delicate thin substrate 18 added strength. The thin substrate 18 is then laminated to the final surface 26. In one embodiment, the final surface 26 corresponds to a car windshield 34. Playback lamps 36 located in the dashboard 32 illuminate the thin substrate 18 to read the holographic image.

15 Claims, 1 Drawing Sheet

HOLOGRAM TRANSFER PROCESS

BACKGROUND OF THE INVENTION

1. Technical Field

This invention relates to methods of making holograms and, more particularly, to methods of making holograms on thin substrates suitable for use on automotive windows.

2. Discussion

There exists several potential application for holograms on transparent surfaces. One such application would be the use of a hologram on or in a car windshield.

Holograms on thin substrates, whether plastic or glass, are difficult to form, especially if the photosensitive material is a low sensitivity material such as dichromated gelatin. One possible technique for obtaining holographic projections on thin transparent substrates would be to hold the substrate between two thicker transparent substrates during exposure. One disadvantage with this technique is that during later processing steps the thin substrate would be unprotected and the fragile glass could be damaged. An alternative technique would be to use a plastic film base which would survive the processing steps but it would not provide the same protection as glass laminated onto the windshield. Other techniques might involve transferring just the photosensitive film onto the windshield. Here the disadvantage is lack of environmental protection that the glass provides.

SUMMARY OF THE INVENTION

Pursuant to the present invention, an improved method of making a hologram on a thin substrate which can then be laminated to a final surface for playback. Initially, the thin substrate is laminated to a temporary support. One side of the thin substrate is then coated with a photosensitive material and exposed to produce the hologram image upon later illumination. The thin substrate and temporary support are then subjected to wet developing suitable to the photosensitive material used. The thin substrate is then removed from the temporary support. In such manner, the photosensitive material gives the thin substrate strength and thus the thin substrate with photosensitive material can survive the final lamination step. The thin substrate, with photosensitive material on one side, is then laminated to a final surface with the photosensitive material sandwiched between the thin substrate and the final surface.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 1:
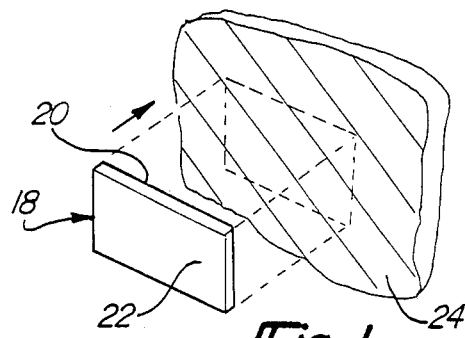
FIG. 1 partial perspective view of a thin substrate being laminated to a temporary support.

The four textual blocks pictorially shown in 10, 12, 14 and 16 generally correspond with the method steps shown in FIGS. 1-4. FIG. 1 shows a thin substrate 18 with a backside 20 and a front side 22, and a temporary support 24. Substrate 18 is a 0.003-0.007 inch thick sheet of transparent glass. The thin substrate 18 is laminated to the temporary support 24 by forming a puddle of adhesive, preferably UV11-4M1 which is a UV curable cement, on the temporary substrate 24 and lowering the thin substrate 18 such that its backside 20 is centered over the puddle of adhesive as described in block 10 of FIG. 5. To remove the excess adhesive, a lint-free towel is placed over the exposed front side 22 of the substrate 18 and a rubber roller is applied on top of the lint-free towel. Using hand pressure the roller is rolled over the towel in different directions and it is then removed. A solvent wipe is used to remove the remainder of adhesive.

Figure 2:
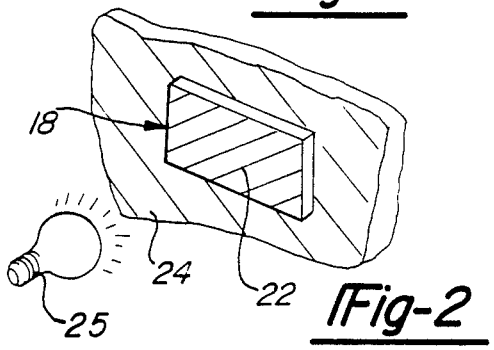
FIG. 2 is a partial perspective view diagram of the thin substrate and temporary support being exposed.
Figure 3:
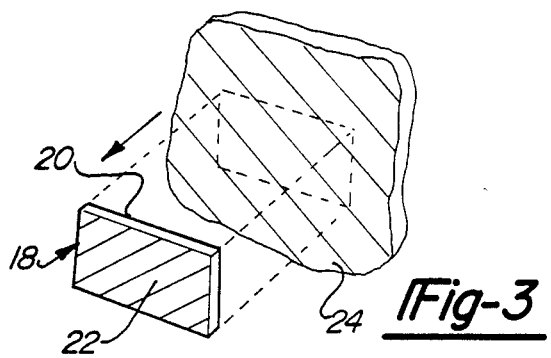
FIG. 3 is a partial perspective view of the thin substrate being removed from the temporary support.
Figure 4:
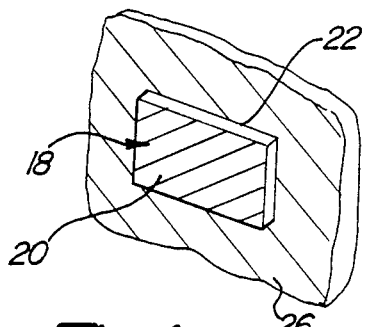
FIG. 4 is a partial perspective view of the thin substrate being laminated to the final surface.

FIG. 2 shows the thin substrate 18 laminated to the temporary support 24. The thin substrate 18 and the temporary support 24 are exposed to an ultraviolet radiation source 25 until the adhesive cures. In one embodiment, the ultraviolet radiation source provides an exposure of 7 m.watts/cm$^2$ at 366 nanometers for two minutes. The thin substrate of the support is then cleaned with acetone soaked lint free wipes. The exposed front side 22 of the thin substrate 18 is then coated with a photosensitive material, preferably dichromated gelatin, by known methods such as cast coating or spin coating. The photosensitive material is then allowed to dry. Preferably, the dichromated gelatin is allowed to dry overnight. Exposure of the photosensitive material can be accomplished in any suitable exposure system. In this case, coherent reference and object beams interfere to expose the photosensitive material to form an interference pattern which can be later illuminated upon playback. Ideally, exposure should be accomplished with a method of index matching to prevent& noise holograms from the surface reflections. The thin substrate 22 and temporary support 24 are then subjected to a wet developing step suitable to the photosensitive material used. In the case of dichromated gelatin, the wet developing step includes a chemical hardening bath, a gelatin swelling bath, and a series of dehydration baths of varying concentrations of 2-propanol with temperatures ranging from 18°-25° Celsius. Finally, an alcohol bath at the boiling point may be used.

The thin substrate 18 and the temporary support 24 are then put into an oven at 60°-100° Celsius for stabilization of the peak reflection wavelengths of the hologram. The entire assembly should remain in the oven until the adhesive softens. The photosensitive material is then cut along the edge of the thin substrate with a razor blade. The thin substrate 18 is then carefully pried from the temporary support 24 preferably using a stainless steel shim approximately 0.002 inches thick. The combination of the holographic medium and the thin substrate 18 have much greater strength than just the thin substrate 18 alone.

The back side 20 is cleaned using low adhesive masking tape to remove any adhesive flakes and finally an appropriate solvent wipe such as acetone. The thin substrate 18 is then laminated to the final surface 26 with side 22 containing the holographic medium sandwiched between the body of the thin substrate 18 and the final surface 26 as shown in block 16 of FIG. 5. Lamination is accomplished by using dried polyvinyl butyral between the windshield and the hologram/thin substrate 18. Normal polyvinyl butyral may destroy an ordinary dichromated gelatin hologram because of its water content.

Figure 5:
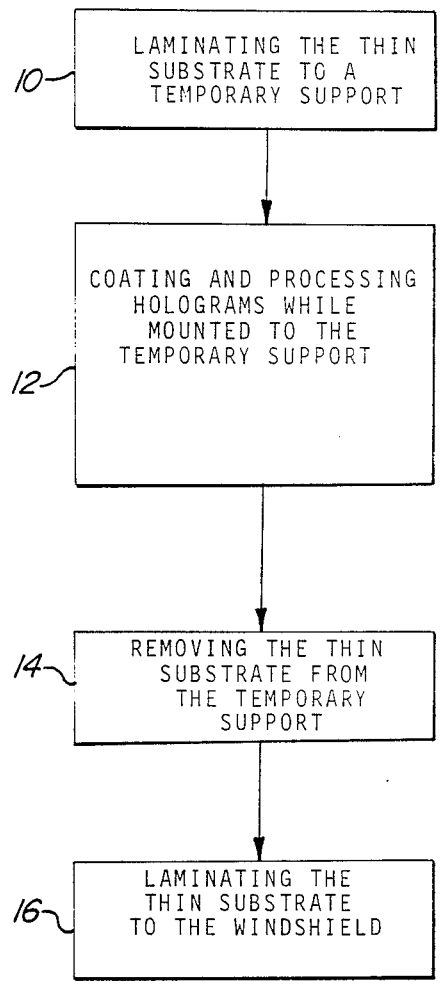
FIG. 5 is a block diagram outlining the steps for making a hologram in accordance with the teachings of this invention.
Figure 6:
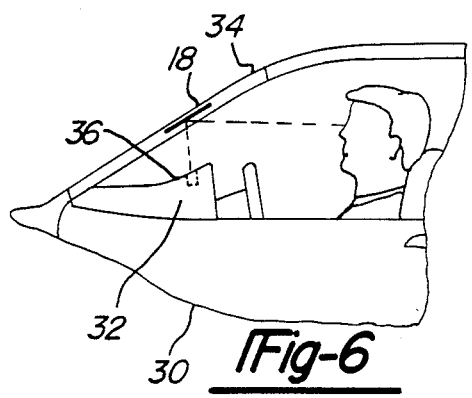
FIG. 6 is a side view showing the completed hologram of the preferred embodiment within a windshield of a vehicle.

In the embodiment shown in FIG. 6, with reference also to FIG. 5, the hologram is used in an automobile 30. The thin substrate 18 is laminated to a car windshield 34, side 22 down, after being removed from the temporary support 24. Here, the playback lamps 36 can be located in the dashboard 32.

It should also be noted that in the embodiment shown, the thin substrate, final surface, and temporary support are glass. Plastic as well as other surfaces are suitable to the methods described.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon study of the specification, drawings and the following claims.

What is claimed is:

1. A method for making a hologram comprising:
   (a) mounting a first side of a thin substrate to a temporary thicker support which includes:
      (i) applying adhesive between the first side of said thin substrate and said temporary support, and
      (ii) exposing said thin substrate to ultraviolet radiation until said adhesive has cured;
   (b) coating a second side of said thin substrate with a photosensitive material;
   (c) exposing said photosensitive material to produce a hologram therein;
   (d) developing the hologram while on the temporary support;
   (e) removing said thin substrate from said temporary substrate; and
   (f) laminating said thin substrate to a final surface with the second side down.

2. The method of claim 1 wherein step (d) includes placing said thin substrate and said temporary support into an oven at 60°-100° Celsius for stabilization of the peak reflection wavelengths of the hologram until said adhesive softens.

3. The method of claim 2, wherein step (d) includes cutting around the edge of said thin substrate with a razor blade to remove excess photosensitive material.

4. The method of claim 3, wherein said removal of said excess photosensitive material is accomplished by placing a lint-free towel over said second side of said thin substrate, applying a rubber roller on top of said towel, removing said lint-free towel and applying a solvent wipe to remove the remainder of said excess photosensitive material.

5. The method of claim 4, wherein said solvent is acetone.

6. The method of claim 1, wherein said thin substrate is glass.

7. The method of claim 1, wherein said final surface is glass.

8. The method of claim 1, wherein step (a) includes forming a puddle of adhesive on said temporary thicker support, centering said thin substrate and lowering said thin substrate slowly onto said temporary thicker support.

9. The method of claim 1, wherein step (b) includes allowing said photosensitive material to dry.

10. The method of claim 1, wherein step (c) includes index matching to eliminate noise holograms.

11. The method of claim 1, wherein step (d) includes using a stainless steel shim to remove said thin substrate from said temporary support.

12. The method of claim 1, wherein said photosensitive material is dichromated gelatin.

13. The method of claim 1, wherein step (f) includes using dried polyvinyl butryal to affix the substrate to the final surface.

14. A method for attaching a thin, transparent holographic substrate to a windshield of a vehicle, said improvement comprising:
   (a) adhering a first side of said thin, transparent substrate with adhesive to a temporary support, which includes exposing said thin, transparent substrate and said temporary support to ultraviolet radiation to cure said adhesive;
   (b) covering a second side of said thin, transparent substrate with a photosensitive material;
   (c) illuminating said photosensitive material such that a desired holographic image is produced therein;
   (d) subjecting said thin substrate and said temporary support to wet processing to develop the holographic image;
   (e) detaching said transparent substrate from said temporary support; and
   (f) securing said transparent substrate, second side down, with adhesive to said windshield.

15. The method of claim 14, wherein the adhesive of step (f) is dried polyvinyl butyral.

* * * * *